(12) United States Patent
Lee

(10) Patent No.: US 6,935,188 B2
(45) Date of Patent: Aug. 30, 2005

(54) SURFACE-MOUNTED TYPE CLAMPING FORCE STRAIN METER ASSOCIATED WITH A LOCATING SEAT

(76) Inventor: Tony Lee, 6F, No. 5, Lane 83, Kwang Fu Road, Sec. 1, San Chung City, Taipei Hsien (TW)

( * ) Notice: Subject to any disclaimer, the term of this patent is extended or adjusted under 35 U.S.C. 154(b) by 16 days.

(21) Appl. No.: 10/732,420

(22) Filed: Dec. 11, 2003

(65) Prior Publication Data

US 2005/0126303 A1 Jun. 16, 2005

(51) Int. Cl.$^7$ ................................................ G01N 3/02
(52) U.S. Cl. ........................................................ 73/860
(58) Field of Search .......................... 73/818, 819, 831, 73/833, 856

(56) References Cited

U.S. PATENT DOCUMENTS 5,767,416 A * 6/1998 Conard ........................ 73/856
5,846,097 A * 12/1998 Marian, Jr. .................. 439/289
6,601,456 B1 * 8/2003 Davidson et al. ............. 73/808

* cited by examiner

Primary Examiner—Max Noori
(74) Attorney, Agent, or Firm—Rosenberg, Klein & Lee (57) ABSTRACT

A surface-mounted type clamping force strain meter is mounted via a locating seat to a loaded surface of a load-bearing column of a forming machine, so as to measure any stretch, tension, and surface stress of the load-bearing column. The strain meter includes a sensing element having two signal lines extended therefrom, and the locating seat includes a seat body and a plurality of cushion pads. The seat body is provided at two opposite surfaces with communicable first and second receiving recesses. An amplifier base board is fitted in the first receiving recess, and the cushion pads are fitted in the second receiving recesses. The signal lines of the strain meter are upward extended through the cushion pad and the seat body to connect with the amplifier base board, and the sensing element is partially exposed from a bottom of the locating seat to contact with the forming machine.

2 Claims, 8 Drawing Sheets

SURFACE-MOUNTED TYPE CLAMPING FORCE STRAIN METER ASSOCIATED WITH A LOCATING SEAT

FIELD OF THE INVENTION

The present invention relates to a surface-mounted type clamping force strain meter associated with a locating seat, and more particularly to a surface-mounted type clamping force strain meter mounted via a locating seat to a loaded surface of a load-bearing column.

BACKGROUND OF THE INVENTION

Plastics are low weight and relatively tough materials suitable for making various kinds of products for use in our daily life, and plastic-related craft and plastic industry are always important to the modern society. General forming machines, such as plastic injection-molding machines, die casting machines, etc., mainly include two units, namely, an injection mechanism for injecting thermal plastic material and a forming mechanism for opening and closing a mold. The mold generally includes a fixed part and a movable part. Plastic material fed into a material barrel of the injection mechanism enters into an injection barrel via a valve on the material barrel, and is forced forward by a rotating spiral band. At this point, plastic granules are forced to contact with the wall of a heating barrel and heated, molten, and softened. The plastic material is further forced forward in a spiral lead and injected into a mold cavity of a closing mold. A movable clamping cap of the mold is then moved to open or close the mold.

The movement of the movable part of the mold to close the mold is also referred to as clamping mold. The pressure or force at clamping the mold has important influence on the precision of the molded plastic material. Moreover, uneven distribution of the force at clamping the mold would result in bias of the molded plastic material. Therefore, it is necessary to measure the force at clamping the mold and use the measured value as a basis to adjust the clamping force.

The plastic injection-molding machine or die-casting machine developed in the early stage, either a vertical type or a horizontal type as illustrated in the accompanying drawings, typically includes four tie bars. The movable clamping cap is slidably mounted on the four tie bars to move relative to a fixed clamping cap (not shown) and thereby opens or closes the mold. In the process of clamping the mold on the forming machine, the movable clamping cap on the four tie bars applies pressure on the fixed part of the mold, and the applied pressure is axially fed back to the tie bars. The total pressure fed back to all the four tie bars is defined as the clamping force. The higher the pressure applied by the movable clamping cap is, the higher the clamping force is, that is, the higher the axial force fed back to the tie bars is. In other words, on the basis of the same molding material, the higher the pressure applied by the movable clamping cap is, the larger the axial stretch of the tie bars is.

A conventional way to measure the clamping force is to provide a conventional meter near a rear end of each tie bar. When the tie bar has any minor change in its overall length, that is, has any axial stretch, during the process of clamping the mold to touch a probe of the meter, the probe would contact with and press against a spring inside the meter, so that the amount of axial stretch of the tie bar may be read from a pointer of the meter. The force axially applied to the tie bar, that is, the clamping force, may then be calculated from a specific formula using the reading of the meter. This way of measuring the clamping force has the following disadvantages:

1. The conventional meter has low accuracy, and the spring inside the meter is subject to elastic fatigue after being used over a long time.

2. An operator has to visually observe the reading of axial stretch amount of the tie bar on the conventional meter. Errors might be caused due to different observation angle and personal subjective judgment or negligence to result in inaccurate data.

Figure 1:
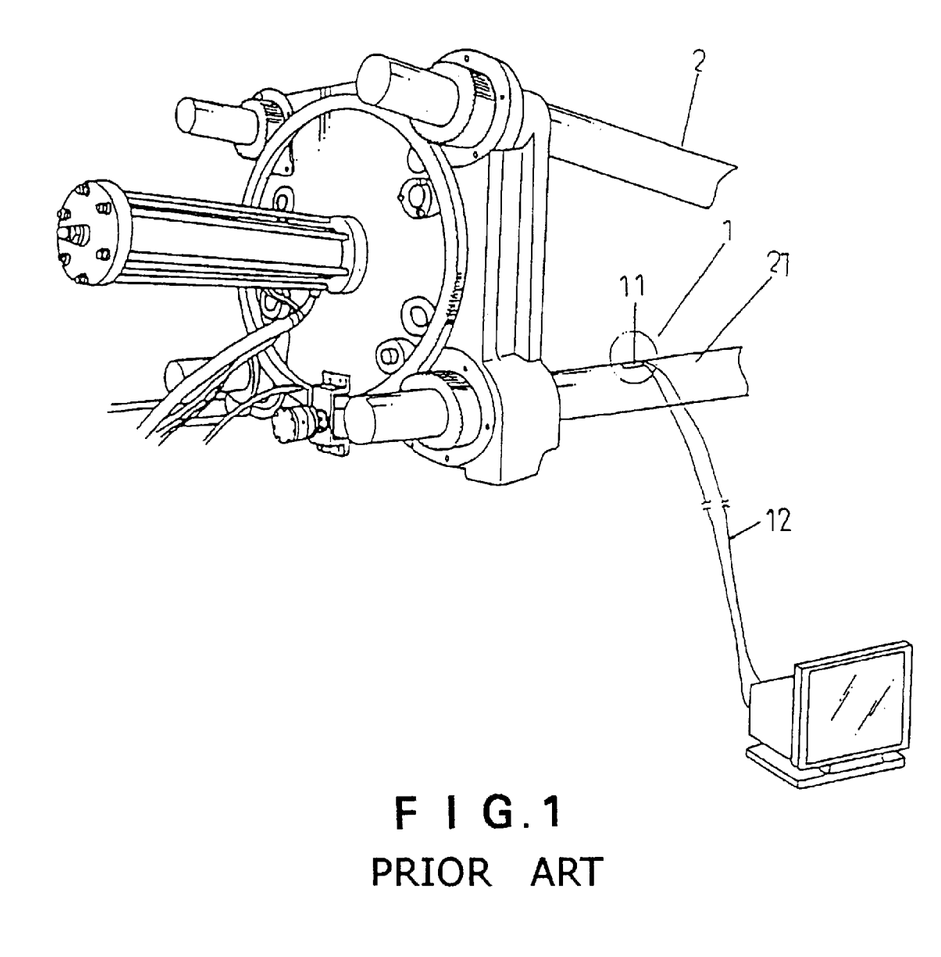
FIG. 1 is a perspective view showing the position of a first conventional clamping force strain meter adhered to a tie bar of a forming machine.
Figure 1A:
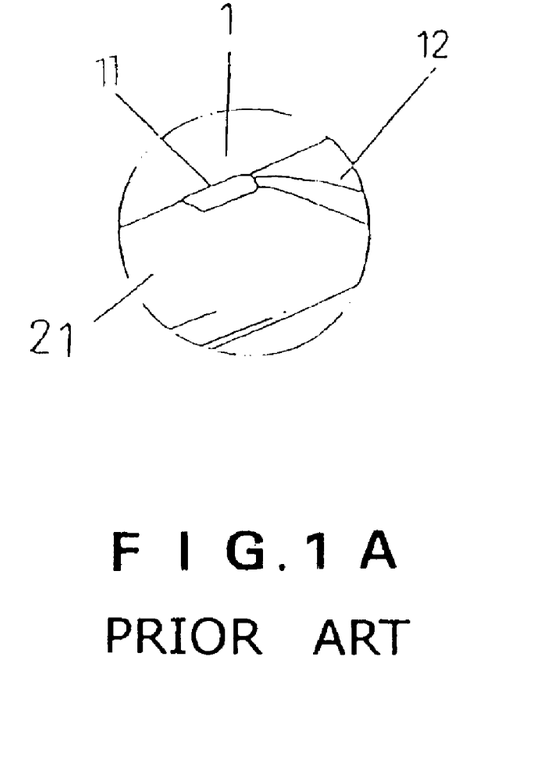
FIG. 1A is an enlarged view of the circled area of FIG. 1.

FIG. 1 shows another conventional strain meter 1 developed for measuring the clamping force, and FIG. 1A is an enlarged view of the circled area of FIG. 1. Please refer to FIGS. 1 and 1A. The strain meter 1 mainly includes a sensing element 11 having two signal lines 12 extended therefrom. The two signal lines 12 are electrically connected to a monitor, so that a signal from the sensing element 11 may be processed by an operation unit and amplified by an amplifier unit, and finally displayed on the monitor. This type of strain meter 1 is flatly adhered to an outer surface of the tie bar 21 of an injection-molding machine, which will be briefly referred to as the forming machine 2 hereinafter. When the movable clamping cap is slid on the tie bars 21 relative to the fixed clamping cap to open or close the mold, the sensing element 11 is able to detect a change in the electric resistance of the tie bars 21 due to the axial stretch thereof, and thereby measures the clamping force at the time the mold is closed. However, this type of strain meter 1 has the following disadvantages:

1. The sensing element 11 is removably adhered to the outer surface of the tie bar 21. When the sensing element 11 is released from the tie bar 21 after use, it is no longer adhesive and the strain meter 1 must be discarded. It is apparently not economical to discard the high precision and costly strain meter when the same has been used for only one time.

2. The sensing elements 11 are not easily adhered to the tie bars 21 at uniform angle and tightness, and would therefore have adverse influence on the measurements.

3. It is troublesome and time-consuming to accurately adhere the sensing elements 11 to the tie bars 21 at uniform angle and tightness.

Figure 2:
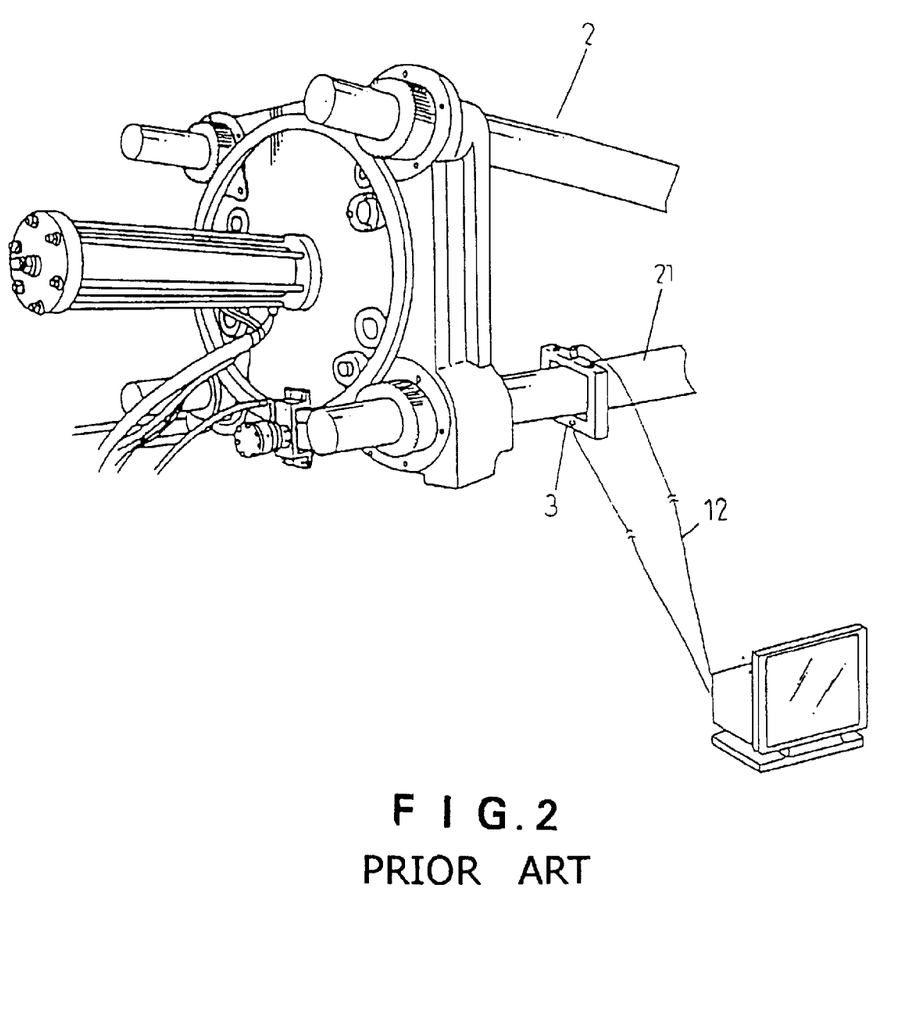
FIG. 2 is a perspective view showing the position of a second conventional clamping force strain meter mounted around a tie bar of a forming machine.

FIG. 2 shows an alternative way developed by the same inventor of the present invention to overcome the problems existed in the conventional clamping force strain meter. In this alternative way, the strain meter is associated with a rectangular frame 3 that is externally mounted around the tie bar 21 of the forming machine 2, and the sensing element has one surface bearing against the outer surface of the tie bar 21 to detect any change in the electric resistance and, accordingly, the axial stretch of the tie bar.

A disadvantage of the above alternative way is an amplifier is required to amplify the signal from the strain meter associated with the frame. The amplifier must be separately provided and would inevitably interfere with the layout of the working site. Moreover, complicate procedures are involved in wiring the amplifier and related parts, and the amplifier could not be conveniently moved once it is fixed to a certain position.

It is therefore tried by the inventor to develop a surface-mounted type clamping force strain meter associated with a locating seat to enable easy and even more accurate detecting and measuring of the clamping force.

SUMMARY OF THE INVENTION

A primary object of the present invention is to provide a surface-mounted type clamping force strain meter for mounting on an outer surface of a forming machine via a locating seat to measure any stretch, tension, and surface stress of a load-bearing column on the forming machine. The strain meter includes a sensing element having two signal lines extended therefrom, and the locating seat includes a seat body and a plurality of cushion pads. The seat body is provided at two opposite surfaces with communicable first and second receiving recesses. An amplifier base board is fitted in the first receiving recess, and the cushion pads are fitted in the second receiving recesses. The signal lines of the strain meter are upward extended through the cushion pad and the seat body to connect with the amplifier base board, and the sensing element is partially exposed from a bottom of the locating seat to contact with the forming machine.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 3:
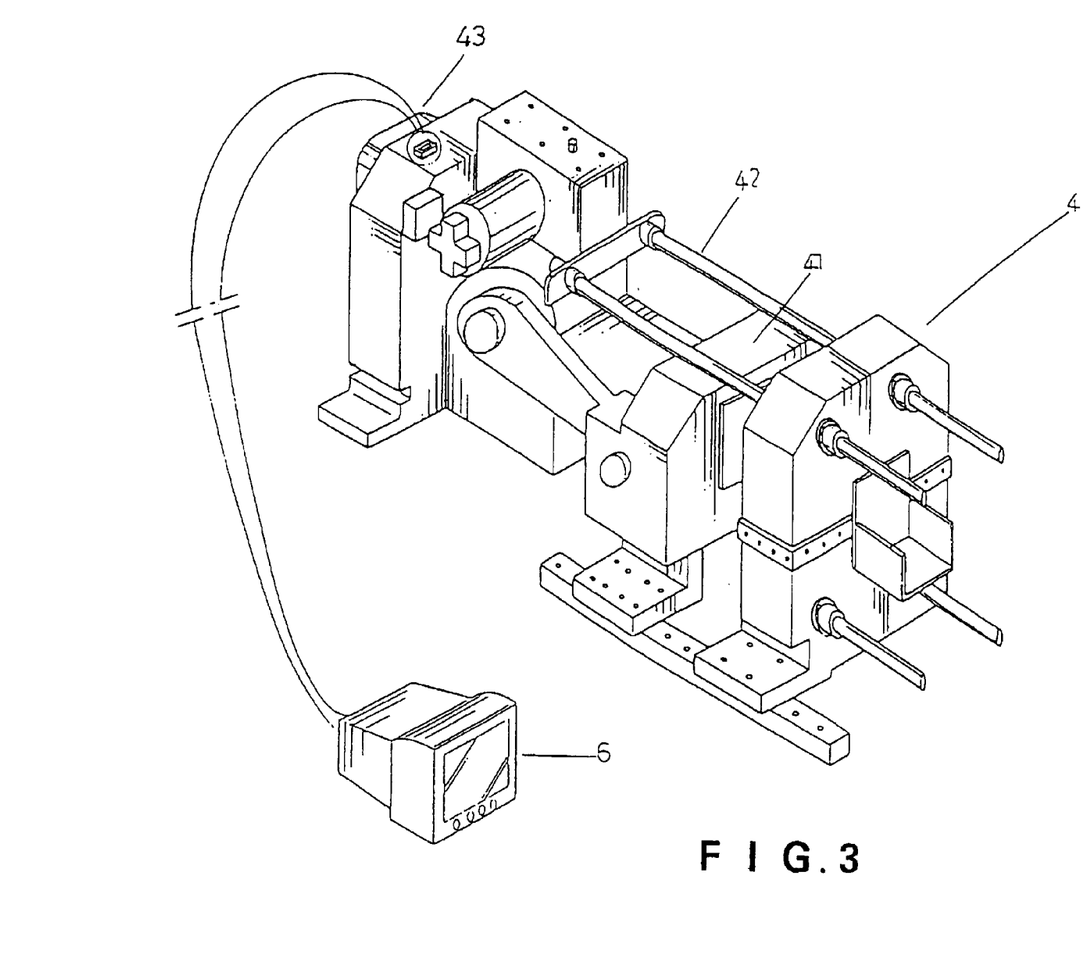
FIG. 3 is a perspective view showing the position of a clamping force strain meter associated with a locating seat according to the present invention on a back plate of a forming machine.
Figure 3A:
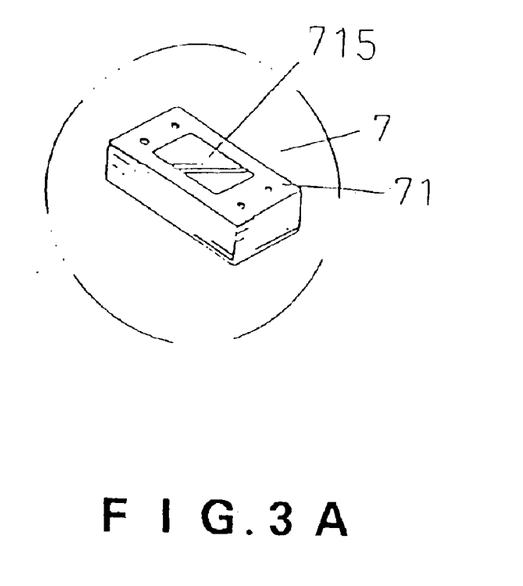
FIG. 3A is an enlarged view of the circled area of FIG. 3.
Figure 4:
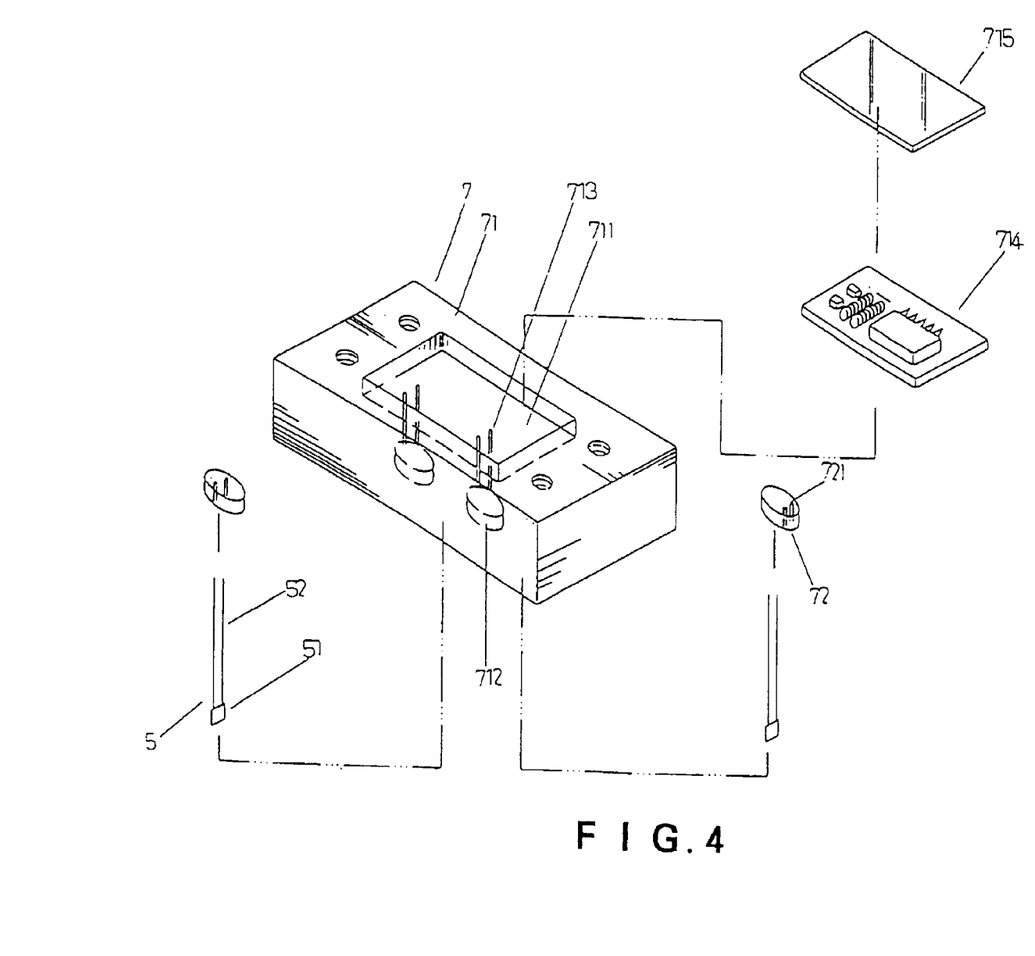
FIG. 4 is an exploded perspective view of the present invention.

Please refer to FIGS. 3, 3A, and 4. The present invention relates to a surface-mounted type clamping force strain meter 5 associated with a locating seat 7 for mounting on a loaded surface of a load-bearing column of a forming machine, including injection-molding machine and die casting machine, a punching machine, a press, or other machinery, so as to measure any stretch, tension, and surface stress of the load-bearing column. A forming machine 4 will now be used as an example to describe the present invention. The forming machine 4 includes a movable clamping cap 41 slidably guided by four tie bars 42, and a back plate 43 connected to and pressed by the movable clamping cap 41 to move forward or backward and thereby closes or opens a mold. To enable testing of a clamping force, the clamping force strain meter 5 of the present invention is mounted on the forming machine 4 at a predetermined position. The strain meter 5 mainly includes a sensing element 51 having two signal lines 52 extended therefrom, so that a signal from the strain meter 5 is processed with an operation unit (not shown) and displayed on a monitor 6 electrically connected to the locating seat 7. The strain meter 5 is mounted on the forming machine 4 by fixing the associated locating seat 7 to the outer surface of the forming machine.

The locating seat 7 mainly includes a seat body 71 having a first surface, on which a first receiving recess 711 is formed, and a second surface opposite to the first surface and having at least one second receiving recess 712 provided thereon. Body passages 713 are extended through the seat body 71 to vertically communicate the first receiving recess 711 with each second receiving recess 712. An amplifier base board 714 is fitted in the first receiving recess 711, and a flat panel 715 is laid over the amplifier base board 714 to give the whole locating seat 7 a beautiful appearance. At least one cushion pad 72 made of a soft material, such as a rubber material, is fitted in the at least one second receiving recess 712. Each cushion pad 72 is provided with pad passages 721 to align and communicate with the body passages 713 correspondingly provided between the first receiving recess 711 and the second receiving recess 712 into which the cushion pad 72 is fitted. The two signal lines 52 of the strain meter 5 are separately upward inserted through the pad passages 721 on the cushion pad 72 and the body passages 713 on the seat body 71 to connect with the amplifier base board 714 to form contacts. And, the sensing element 51 of each strain meter 5 is partially exposed from a bottom of the seat body 71 to contact with the outer surface of the forming machine 4 at the predetermined position.

During the process of closing the mold, the back plate 43 applies a force against the fixed part of the mold. At this point, the back plate 43 is subject to a backfeed from the force applied to the fixed part of the mold just the same as the backfeed to the tie bars 41. Therefore, the locating seat 7 with the strain meter 5 assembled thereto may be mounted on the back plate 43 for the purpose of measuring the clamping force.

Figure 5:
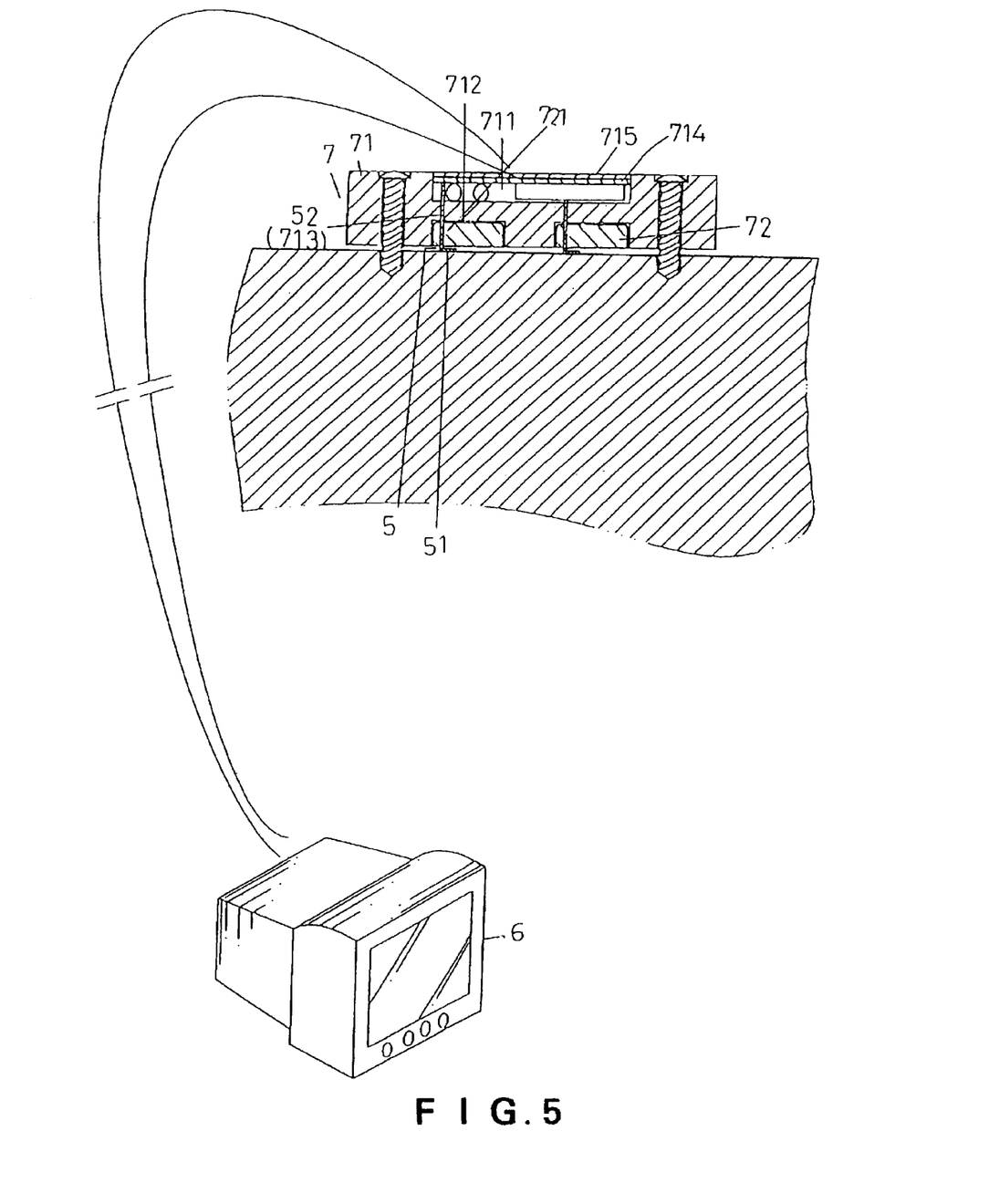
FIG. 5 is an assembled sectional view of a first embodiment of the present invention and shows the electrical connection of the present invention to a monitor.

Please refer to FIG. 5. The signal lines 52 of each strain meter 5 are vertically upward inserted into the pad passages 721 on the cushion pad 72 and extended through the corresponding body passages 713 on the seat body 71 to connect with the amplifier base board 714 to form contacts, and the sensing element 51 is partially exposed from the bottom of the locating seat 7 to contact with an outer surface of the back plate 43 of the forming machine 4. In the illustrated embodiment of FIG. 5, the sensing element 51 has a relatively large area exposed from the locating seat 7, and may therefore be flexibly bent to enable a flat surface contact with the predetermined outer surface of the forming machine 4.

Figure 6:
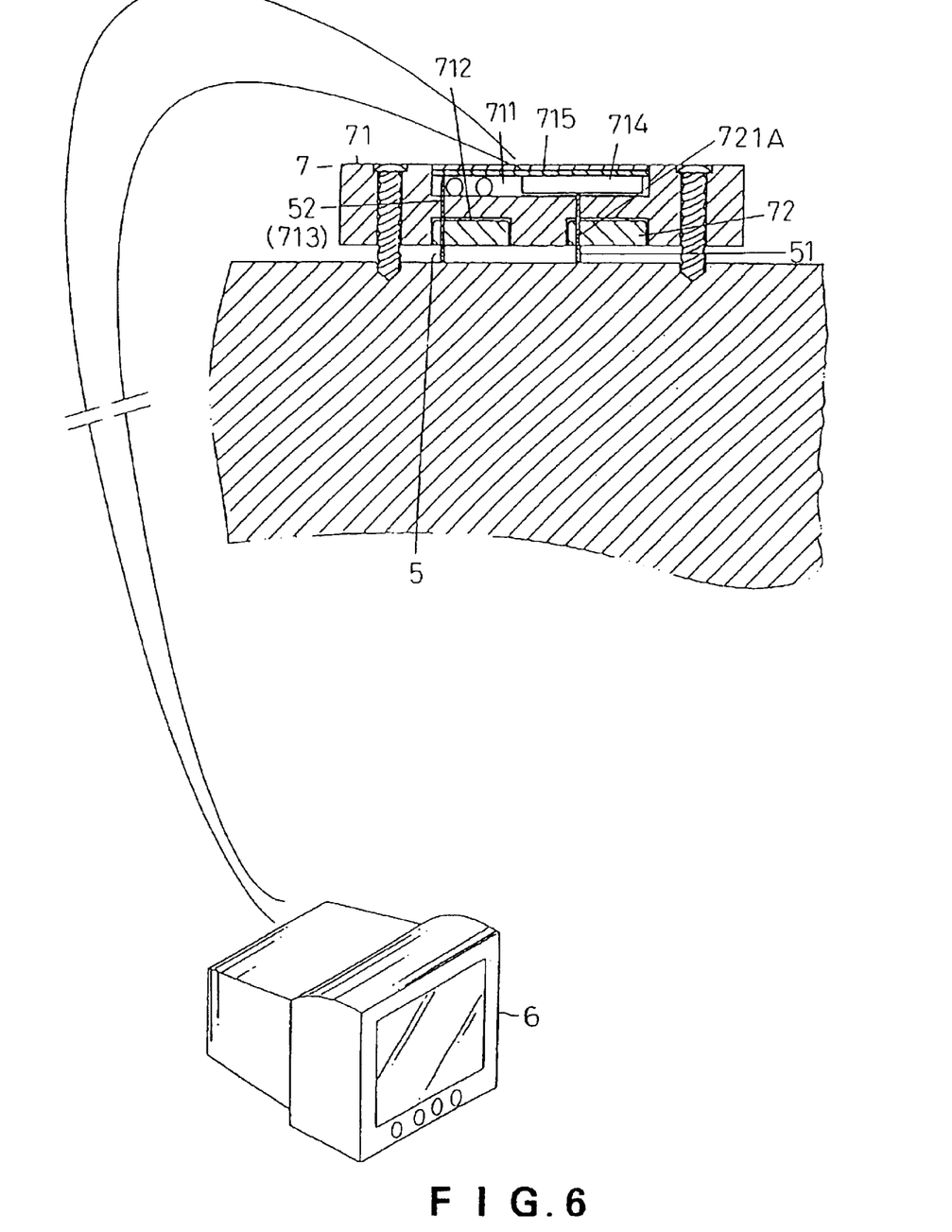
FIG. 6 is an assembled sectional view of a second embodiment of the present invention and shows the electrical connection of the present invention to a monitor.

FIG. 6 illustrates the mounting of a clamping force strain meter 5 and associated locating seat 7 according to another embodiment of the present invention to the forming machine 4. In this embodiment, flat-profiled pad passages 721A substitute for the pad passages 721 on each cushion pad 72 in the first embodiment of FIG. 5, and the sensing element 51 of each strain meter 5 is directly upward inserted into the flat-profiled pad passage 721A and extended through the body passage 713 to connect with the amplifier base board 714 to provide contacts. The sensing element 51 in this embodiment is partially exposed from the bottom of the locating seat 7 to enable an end surface contact with the forming machine 4.

When a force is applied in the process of closing the mold, a feedback force thereof would cause the back plate 43 to produce a minor axial stretch. Such axial stretch of the back plate 43 produces change in the electric resistance of the back plate 43, which may be detected by the sensing element 51 in contact with the back plate 43 to produce a signal sent via the signal lines 52 to the amplifier base board 714 fitted in the seat body 71 of the locating seat 7. An operation unit conducts an operation on the signal to calculate a variation of the axial stretch of the back plate 43. The calculated variation is then displayed on the monitor 6 to indicate the value of strain of the back plate.

The clamping force strain meter associated with a locating seat according to the present invention has the following advantages:

1. The amplifier base board is directly provided in the locating seat to reduce the space that is otherwise occupied by a separate amplifier in the working site. The initially complicate procedures for setting the amplifier are simplified to enable an increased mobility of the present invention. That is, the amplifier base board may be installed at any place along with the strain meter and the locating seat. Moreover, the signal from the strain meter may be amplified in real time and sent to the operation unit without distortion.

2. The sensing element is detachably associated with the locating seat and can therefore be repeatedly used many times after each measurement. The high precision and costly strain meter can therefore be used in a much more economical manner.

3. The sensing element is associated with the locating seat to enable uniform and accurate mounting angle on the forming machine and ensure accurate and stable measurements.

4. The strain meter and the associated locating seat may be mounted on the forming machine at any suitable position, such as on the back plate, and therefore has largely widened applications.

5. With the present invention, it is possible to quickly and accurately know the force applied to each tie bar.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A surface-mounted type clamping force strain meter associated with a locating seat for mounting on a loaded surface of a load-bearing column of a forming machine, including injection-molding machine and die casting machine, a punching machine, a press, or other machinery, so as to measure any stretch, tension, and surface stress of said load-bearing column; comprising a clamping force strain meter and a locating seat;

said clamping force strain meter comprising a sensing element having two signal lines extended therefrom, so that a signal from said clamping force strain meter is processed with an operation unit and displayed on a monitor electrically connected to said locating seat, via which said clamping force strain meter is mounted on said forming machine; and said locating seat comprising a seat body and at least one cushion pad;

said seat body having a first surface, on which a first receiving recess is formed, and a second surface opposite to said first surface and having at least one second receiving recess provided thereon, a plurality of body passages being extended through said seat body to vertically communicate said first receiving recess with said second receiving recesses, and an amplifier base board being fitted in said first receiving recess; and said at least one cushion pad being made of a soft material and separately fitted in said at least one second receiving recess, said cushion pad being provided with pad passages to communicate with said body passages correspondingly provided between said first receiving recess and said second receiving recess; and said signal lines of said clamping force strain meter being upward inserted through said pad passages on said cushion pad and said body passages on said seat body to connect with said amplifier base board to form contacts; and said sensing element of said strain meter being partially exposed from a bottom of said seat body to contact with an outer surface of said forming machine.

2. The surface-mounted type clamping force strain meter associated with a locating seat as claimed in claim 1, wherein said pad passages provided on said cushion pads are flat-profiled, and wherein said sensing element of said clamping force strain meter is directly inserted into a corresponding one of said pad passages.

* * * * *